(12) United States Patent
Bronder

(10) Patent No.: US 10,671,157 B2
(45) Date of Patent: Jun. 2, 2020

(54) VESTIBULAR ANCHORING

(71) Applicant: Microsoft Technology Licensing, LLC, Redmond, WA (US)

(72) Inventor: Matthew L. Bronder, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/296,980

(22) Filed: Mar. 8, 2019

(65) Prior Publication Data

US 2019/0272026 A1 Sep. 5, 2019

Related U.S. Application Data

(63) Continuation of application No. 15/492,746, filed on Apr. 20, 2017, now Pat. No. 10,268,263.

(51) Int. Cl.
*G06F 3/01* (2006.01)
*A63F 13/212* (2014.01)
*A63F 13/5255* (2014.01)
*G06T 19/00* (2011.01)
*A63F 13/25* (2014.01)
*A63F 13/211* (2014.01)

(52) U.S. Cl.
CPC ............ *G06F 3/012* (2013.01); *A63F 13/211* (2014.09); *A63F 13/212* (2014.09); *A63F 13/25* (2014.09); *A63F 13/5255* (2014.09); *G06T 19/006* (2013.01)

(58) Field of Classification Search
CPC .............................. G06F 3/012; G06T 19/006
See application file for complete search history.

(56) References Cited

U.S. PATENT DOCUMENTS

2017/0032570 A1* 2/2017 Bear ................. H04N 21/42224
2017/0092235 A1* 3/2017 Osman .................... G06F 3/012

\* cited by examiner

*Primary Examiner* — Andrew Sasinowski
(74) *Attorney, Agent, or Firm* — Ray Quinney & Nekeber

(57) ABSTRACT

Methods and devices for presenting a virtual reality image may include receiving head motion information from a positional tracking system that tracks a position and orientation of a head of a user and receiving virtual motion information independent from the head motion information for a virtual reality simulation. The methods and devices may include generating a first scene of the virtual reality simulation based on the virtual motion information and the head motion information. The methods and devices may also include generating a set of visual cues based on the head motion information and rendering a frame including the set of visual cues and the first scene of the virtual reality simulation. The methods and devices may include transmitting the frame of the virtual reality simulation for presentation on a display device.

21 Claims, 6 Drawing Sheets

VESTIBULAR ANCHORING

RELATED APPLICATION

This application is a continuation of U.S. patent application Ser. No. 15/492,746, entitled "VESTIBULAR ANCHORING," filed Apr. 20, 2017, which is incorporated herein by reference in its entirety.

BACKGROUND

The present disclosure relates to computer graphics systems, and more particularly, to presenting images on a display.

One area of computing devices that has grown in recent years are gaming devices and virtual reality (VR) devices, which use a graphics processing unit (GPU) to render graphics from a computing device to a display device based on rendering instructions received from the computing device. In gaming devices, a scene produced on a display device can be oriented or modified based on user input (e.g., movement of an external controller to cause movement of the orientation of the scene, introduction of items into the scene, etc.). Similarly, in VR devices, the scene produced on a display device can be oriented or modified based on user input, where the input may include detecting movement of the user's head (e.g., detected movement of the VR device, such as a head mounted display (HMD)).

A common problem in the application of VR is the establishment of conditions which may promote motion sickness (also referred to as simulation sickness). Individuals may be susceptible to motion sickness in a virtual reality environment because their external view of the world is removed and entirely replaced by a simulated view influenced, but not entirely controlled, by the motion of the body. When the simulated view deviates from what the brain is expecting based on the stimulation of other senses (most notably the vestibular system), illness may result. As such, a user may have an uncomfortable experience while using VR devices when there is a difference in signals sent to the brain by the eyes and the inner ear. For instance, when the user is viewing a VR scene that includes motion, but the user is physically not moving, the difference in motion-related signals sent to the brain may cause the user to feel discomfort, nausea, fatigue, sweating, vertigo, or other motion sickness effects. Once begun, the motion sickness effects typically persist and even worsen until the disagreement between the visual input and signals from the inner ear are resolved.

Simulation sickness in virtual reality may be reduced or prevented by maximizing the accuracy of tracking head motion, maximizing the accuracy of predicting future motion, and minimizing the latency between the calculation of a head pose and the display of a virtual scene corresponding to the pose. When the simulated visual input closely matches the vestibular system physical input, motion sickness may no longer be a factor in virtual reality for a majority of users.

But restricting the view displayed in a virtual reality environment exclusively to the motion of the head may limit the freedom of movement traditionally provided by a simulation maintaining independent manual input controls, such as those found in video games with a first person view. By enforcing strict conformance to head motion, a user may be limited to the range of the physical space containing the VR system; which in turn may limit the range of experiences that may be provided through virtual reality.

For example, while video game simulations may commonly have users running miles across alien worlds while seated on the comfort of a couch and pressing the thumbsticks of a gamepad, translating the same experience into virtual reality may not be possible when restricted to head motion alone, unless wearing a self-contained VR rig with miles of open space matching the terrain of the simulation.

Thus, there is a need in the art for improvements in presenting VR images on a display.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

The present disclosure relates to a virtual reality simulation having a displayed view that reflects accurate head motion in combination with the incorporation of manual input control for additional offset motion. The anchoring of the displayed view with a scene that matches motion sensed by a vestibular system of a user, while also including a scene having virtual motion based on the manual input, may provide a realistic virtual environment while reducing or preventing induced simulation sickness inherent in prior solutions due to the motion disparity between actual user motion and virtual motion.

One example implementation relates to a computer device. The computer device may include a memory storing at least one application configured to run a virtual reality simulation, a processor in communication with the memory and configured to execute the at least one application to run the virtual reality simulation, an operating system in communication with the memory and processor. The operating system, processor, and at least one application may be operable to receive head motion information from a positional tracking system that tracks a position and orientation of a head of a user, receive virtual motion information independent from the head motion information for a virtual reality simulation, generate a first scene of the virtual reality simulation based on the virtual motion information and the head motion information, generate a set of visual cues based on the head motion information, render a frame including the set of visual cues and the first scene of the virtual reality simulation, and transmit the frame of the virtual reality simulation for presentation on a display device.

Another example implementation relates to a method for presenting a virtual reality image. The method may include receiving head motion information from a positional tracking system that tracks a position and orientation of a head of a user. The method may also include receiving virtual motion information independent from the head motion information for a virtual reality simulation. In addition, the method may include generating a first scene of the virtual reality simulation based on the virtual motion information and the head motion information. The method may include generating a set of visual cues based on the head motion information and rendering, at an operating system executing on a computer device, a frame including the set of visual cues and the first scene of the virtual reality simulation. The method may also include transmitting the frame of the virtual reality simulation for presentation on a display device.

Another example implementation relates to computer-readable medium storing instructions executable by a computer device. The computer-readable medium may include at least one instruction for causing the computer device to receive head motion information from a positional tracking system that tracks a position and orientation of a head of a user. The computer-readable medium may include at least one instruction for causing the computer device to receive virtual motion information independent from the head motion information for a virtual reality simulation. The computer-readable medium may include at least one instruction for causing the computer device to generate a first scene of the virtual reality simulation based on the virtual motion information and the head motion information. The computer-readable medium may include at least one instruction for causing the computer device to generate a set of visual cues based on the head motion information. The computer-readable medium may include at least one instruction for causing the computer device to render a frame including the set of visual cues and the first scene of the virtual reality simulation. The computer-readable medium may include at least one instruction for causing the computer device to transmit the frame of the virtual reality simulation for presentation on a display device.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
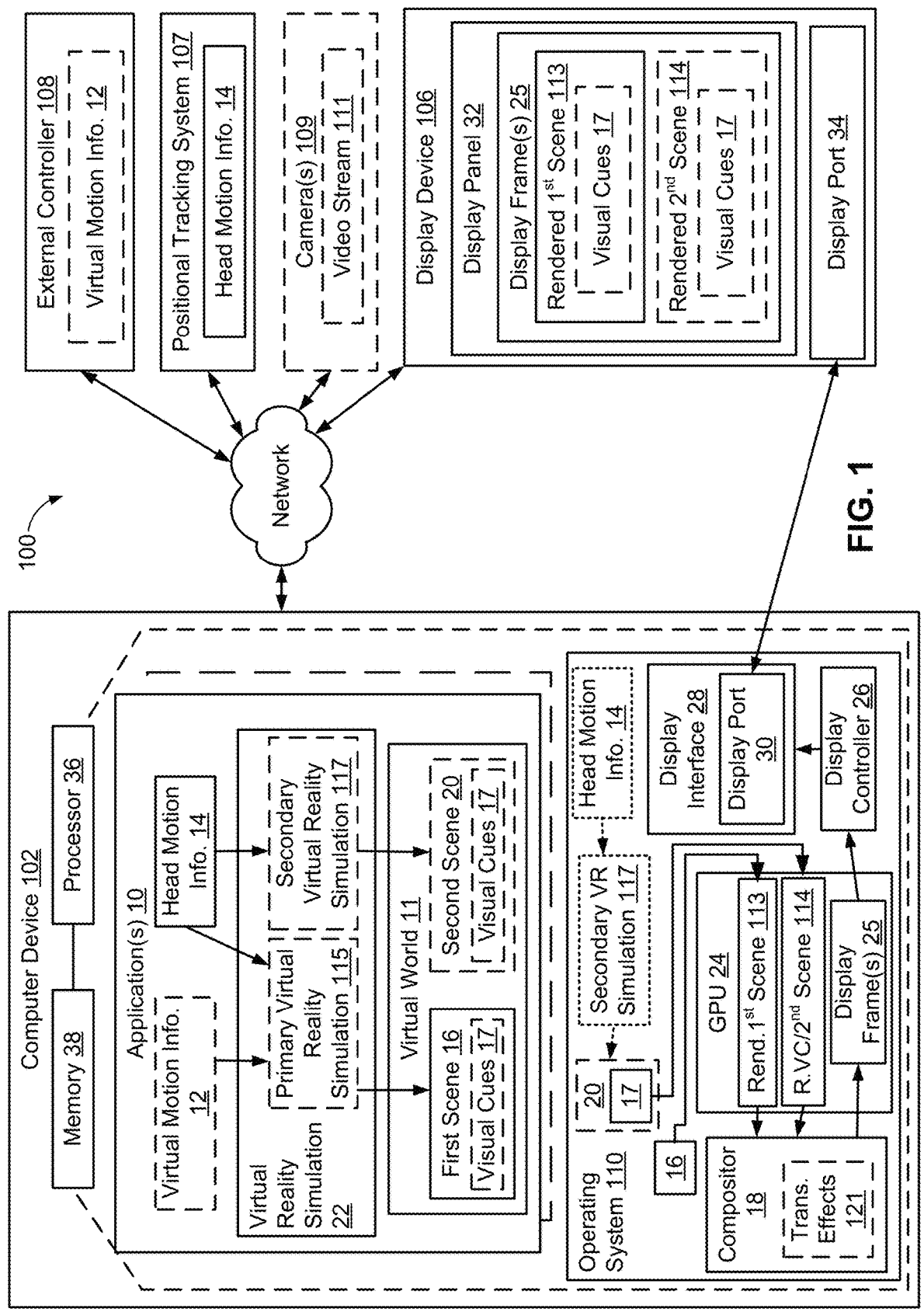
FIG. 1 is a schematic block diagram of an example device in accordance with an implementation of the present disclosure.

This disclosure relates to devices and methods for reducing or preventing simulation sickness when viewing VR scenes using a VR device. As used herein, a VR device may include a device that generates and/or displays virtual reality images (e.g., from at least one virtual environment input), mixed reality (MR) images (e.g., from at least two virtual environment inputs), and/or augmented reality (AR) images (e.g., from at least one virtual environment input and one real environment input).

Vestibular anchoring is a technique whereby a set of visual cues is provided to a user in a virtual reality environment to allow for the application of virtual motion influences that may be taken from sources other than a tracking system in a head mounted display (HMD). The visual cues, and the relative motion of the visual cues, may be sourced based upon head motion information (e.g., a position and/or orientation of a head of a user) received from a positional tracking system. For example, the positional tracking system may be configured to track the movement of an HMD device, and may be independent from or mounted on the HMD device, and thus may be referred to as an HMD-based motion source. In addition, the visual cues may produce visual signals to the brain which may be in agreement with those produced by a vestibular system in response to physical motion of the user. The visual cues with HMD-based motion based on the HMD tracking information (e.g., motion that substantially matches a vestibular sensory input) may then supplement a virtual reality environment presented to the user which itself includes a combination of virtual motion based on virtual motion information received from one or more non-HMD sources (e.g., from a manual input of a user pressing a button or moving a switch on a game controller, or from an application generating the virtual reality environment) and from the HMD-based motion source. The visual cues corresponding to the head motion information may be presented anywhere in the virtual reality environment so that the fusion of complementary visual and vestibular sensory inputs in the brain may overcome the conflicting display of virtual motion that may otherwise manifest as motion sickness.

Thus, this disclosure relates to devices and methods of providing visual cues (e.g., vestibular anchoring cues) which conform to signals from the vestibular system, in conjunction with the display of a primary view of the virtual reality environment having different, conflicting motion corresponding to virtual motion. Such cues could take any form and be present anywhere within a range visible to a user (e.g. a grid blended over the entire scene). In some cases, the cues may be placed in a region of peripheral vision, where a user's perception of detail is less acute. For example, the virtual reality environment (whose virtual user motion includes non-HMD-based influences) may be displayed to a user within a disc-shaped region at the center of vision of each eye, and a set of visual cues whose motion is based exclusively upon the head motion information (e.g., HMD-based motion) may be confined to the region of a peripheral ring surrounding the disc. Anchoring cues in the region of peripheral vision may be less distracting while still providing the necessary signals to the brain.

Further, the devices and methods of this disclosure may include dynamic introduction and removal of the vestibular anchoring cues based on motion influence originating from sources other than the head tracking of a user (adding the cues when such influence is present and removing them when head tracking alone is responsible for motion), the forms of incorporating anchoring cues into a virtual reality scene (with the involvement of possible transition effects), the potential for anchoring cues to be sourced from one or more live camera feeds, and the tuning of cue strength to individual users' comfort needs.

In an implementation, the displayed virtual environment may be a VR simulation having two independent scenes that are fused together into a displayed scene for presentation to the user. For example, a first scene of the two independent scenes may correspond to a primary VR scene and have a first amount of (virtual) motion, and a second scene may correspond to the above-noted visual cues and have a second amount of motion controlled by the head motion information received from the tracking system (e.g., the head motion or HMD tracking information corresponding to the real world motion of the user). The second scene may correspond to a different virtual scene, or to an independent view of the original virtual environment. Thus, the second scene may include the visual cues to match the vestibular sensory input of the user (only based on the head motion information), which may result in the displayed scene inhibiting or reducing motion sickness.

In other words, the first scene of the VR simulation may have a first view region having a first amount of motion that tracks the motion of the virtual scene (where such motion is some fusion of motion sources from the simulation itself, head motion or HMD tracking, and/or user input control). At the same time, the second scene of the VR simulation may have a second view region different from the first view region, and the second scene may have a second amount of motion that is independent of the first amount of motion of the first view region, and that instead tracks the motion of only the HMD (the head motion information, or HMD tracking information, from the tracking system), which is the motion sensed by the inner ears of the user. As mentioned above, in some implementations, the second scene may be presented in a peripheral area surrounding the first scene. As a result, the described devices and methods allow a VR simulation to have one area with independent motion in the virtual world and another area with motion driven by real world motion. By providing coherent sensory input to a user, motion sickness that would otherwise be produced by the conflicting view of the virtual reality scene may be reduced and/or prevented.

Referring now to FIG. 1, an example system 100 for use in connection with presenting VR images having one area with independent motion in the virtual world and another area with motion exclusively driven by real world motion may include a computer device 102 in communication with one or more display devices 106. Computer device 102 may execute at least one application 10 to run a virtual reality simulation 22, which generates and communicates image data for displaying one or more VR images, e.g., display frames 25, defining one or more scenes of the virtual reality simulation 22 on display device 106. Display device 106 may include, for example, a head mounted display (HMD) device, and may have one or more display panels 32 (e.g., light emitting diode (LED), organic LED (OLED), liquid crystal display (LCD), etc.) capable of outputting display frame(s) 25 for viewing by a user of system 100.

Computer device 102 may communicate with a positional tracking system 107 via network 104 and/or through a wired or wireless connection to obtain head motion information 14 to apply to virtual reality simulation 22. Positional tracking system 107 may include, but is not limited to, one or more sensors (e.g., cameras), emitters (e.g., IR LEDs), inertial devices (accelerometer and/or gyroscope), and/or any other position sensing system capable of detecting an orientation, position, and/or movement of a head of a user of system 100 and/or of display device 106 (e.g., HMD device), where a user is looking (e.g., a gaze direction of the eyes), and/or a focus of a user. For instance, in some implementations, such as an "inside-out" implementation, positional tracking system 107 may include but is not limited to one or more depth cameras and one or more inertial measurement units (IMUs), tracking software, a simultaneous localization and mapping algorithm, and one or more processors. In other implementations, such as an "outside-in" implementation, positional tracking system 107 may include but is not limited to one or more sensors (e.g., cameras) for detecting one or more emitters (e.g., IR LEDs) located in the environment, and one or more processors. While illustrated as being separate from display device 106, it should be understood that tracking system 107 may be remote from or located on display device 106, or partially remote from and partially located on display device 106.

In addition, computer device 102 may communicate with one or more external controllers 108 via network 104 and/or through a wired or wireless connection to obtain virtual motion information 12 to apply to virtual reality simulation 22. External controllers 108 may include, but are not limited to, a gamepad, a joystick, keyboard, mouse, or other input device that may provide virtual motion input 12 for a virtual environment, such as a game or a virtual world, of the virtual reality simulation 22.

Optionally, in some cases, computer device 102 may communicate with one or more cameras 109 via network 104 and/or through a wired or wireless connection to obtain video stream information 111 to apply to virtual reality simulation 22. For instance, in some implementations, video stream information 111 from camera(s) 109 may be video images of the real world that may be supplemented by virtual reality images from virtual reality simulation 22 to define augmented reality images for presentation on display device 106. Also, for example, in other implementations, video stream information 111 may be video images of the real world that may be used as an input to create a computerized environmental reconstruction, which can be used by virtual reality simulation 22 for presentation along with other virtual images on display device 106.

Computer device 102 may include an operating system 110 executed by processor 36 and/or memory 38. Memory 38 of computer device 102 may be configured for storing data and/or computer-executable instructions defining and/or associated with operating system 110, and processor 36 may execute such data and/or instructions to instantiate operating system 110. An example of memory 38 can include, but is not limited to, a type of memory usable by a computer, such as random access memory (RAM), read only memory (ROM), tapes, magnetic discs, optical discs, volatile memory, non-volatile memory, and any combination thereof. An example of processor 36 can include, but is not limited to, any processor specially programmed as described herein, including a controller, microcontroller, application specific integrated circuit (ASIC), field programmable gate array (FPGA), system on chip (SoC), or other programmable logic or state machine.

Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices and/or communication networks.

Operating system 110 may include a graphics processing unit (GPU) 24 and a compositor 18 operable to render one or more image frames and determine when to transmit rendered image frames for presentation on display device 106. In particular, compositor 18 may receive one or more VR images having one area with independent motion in the virtual world and another area with motion exclusively driven by real world motion, and work with GPU 24 to combine the areas with different motion and generate one or more display frames 25. GPU 24 and/or compositor 18 may communicate with display controller 26 to transmit rendered image frames, e.g., display frames 25, for presentation on display device 106.

In addition, operating system 110 may also include a display interface 28 that may be communicatively coupled with the processor 36 and/or memory 38 for communicating with the display device 106 via a display port 30. Display port 30 may include various types of ports including, but not limited to, high definition multimedia interface (HDMI) ports, display serial interface (DSI) ports, mobile industry processor interface (MIPI) DSI ports, universal serial bus (USB) ports, Firewire ports, or other embedded or external wired or wireless display ports that can allow communications, for example, via network 104 between computer device 102 and display device 106.

Computer device 102 may also include one or more applications 10 that may be executed by processor 36 to present one or more virtual reality images, e.g., display frame(s) 25, on display device 106. The one or more applications 10 executed by processor 36 may also operate in cooperation with operating system 110, GPU 24, and/or compositor 18 to run virtual reality simulation 22 and generate display frame(s) 25 for presentation on display device 106.

The one or more applications 10 may include virtual reality simulation 22 operable to receive motion input, such as head motion information 14 and/or virtual motion information 12, and render one or more image frames based on the received motion input for presentation on display device 106. For example, the one or more applications 10 may be a virtual reality application that is executable to run virtual reality simulation 22 to generate a virtual world 11. Virtual world 11 may include, but not limited to, a virtual reality game, a mixed reality game, an augmented reality game, an augmented reality environment (such as but not limited to a collaborative work environment), a virtual theater, or any other type of at least partially virtual environment. The one or more applications 10 may receive motion input from positional tracking system 107 and/or external controller(s) 108. For instance, the one or more applications 10 may receive virtual motion information 12 from game controller(s) 108 that corresponds to movement in the virtual world 11, for example, for a character and/or object in the virtual world 11. The one or more applications 10 may also receive the virtual motion information 12 based on, for example, logic in the virtual reality simulation 22. In addition, the one or more applications 10 may receive head motion information 14 from positional tracking system 107 that corresponds to movement in the real world by, for example, display device 106 in the form of an HMD being worn by a user of system 100.

The one or more applications 10 may transform the virtual motion information 12 and/or head motion information 14 into virtual coordinates. The one or more applications 10 may also combine the head motion information 14 and the virtual motion information 12 to determine a virtual pose (position and orientation) of a character and/or object in the virtual world 11. In an implementation, the one or more applications 10 may render a first scene 16 for the virtual world 11 based on the virtual pose of a character and/or object for a scene in the virtual world 11. The first scene 16 may correspond to an original view area of the virtual scene and may track the motion of the virtual scene. The first scene 16 may be a primary virtual scene.

The one or more applications 10 may generate first scene 16, for example, based on a transformation matrix used in traditional scene rendering concatenated by the multiplication of W*V*P, where W is the world matrix, V is the view matrix, and P is the projection matrix. In an implementation, the one or more applications 10 may use the following transformation matrix when rendering the first scene 16:

$$W * V^{simulation} * V^{head} * P$$

where W is the world matrix, P is the projection matrix, $V^{simulation}$ is the camera matrix formed by controller input and/or simulation designs, and $V^{head}$ is the tracked position of the head of a user of system 100 and may incorporate an additional basis transform from an absolute tracking origin into a play-space relative origin that may be established during setup. In addition, either $V^{head}$ or P may apply eye offsets based on, for example, interpupillary distance. Thus, based on the above transformation matrix, the one or more applications 10 may generate first scene 16 and then provide the first scene 16 to compositor 18.

Compositor 18 may also receive either one or more visual cues 17, or second scene 20 defining such visual cues 17, and may work with GPU 24 to generate corresponding rendered frame(s), e.g., rendered first scene 113 and rendered visual cue(s) or second scene 114, that are combined and output as display frame(s) 25.

The one or more visual cues 17, or second scene 20, may be generated by a first one of the one or more applications 10, a second one of the one or more applications 10, or by operating system 110 exclusively based on head motion information 14 such that one or more visual cues 17, or second scene 20, have an amount of motion that substantially matches real world motion sensed by a vestibular system of a user of system 100. Elements included in the one or more visual cues 17, or second scene 20, may have an affinity with the content from first scene 16, or the elements may be composed of an entirely separate set of media.

Further, in some cases, the one or more visual cues 17, or second scene 20 defining such visual cues 17, may be generated by a different virtual reality simulation, or an independent view of a same virtual reality simulation, as compared to the virtual reality simulation that generated first scene 16. In other words, virtual reality simulation 22 may include a primary virtual reality simulation 115 that generates first scene 16, and a secondary virtual reality simulation 117 that generates one or more visual cues 17, or second scene 20. In this case, secondary virtual reality simulation 117 may be a different virtual reality simulation than primary virtual reality simulation 115, or an independent view of the same virtual reality simulation.

Accordingly, in some cases, a first one of the one or more applications 10 may generate both first scene 16 and the one or more visual cues 17 or second scene 20. For example, in this case, the first one of the one or more applications 10 may run primary virtual reality simulation 115 that generates first scene 16 and secondary virtual reality simulation 117 that generates one or more visual cues 17, or second scene 20. In some implementations, the first one of the one or more applications 10 may then combine first scene 16 and one or more visual cues 17, or second scene 20, and provide the combination to compositor 18. In other implementations, the first one of the one or more applications 10 may send first scene 16 and one or more visual cues 17, or second scene 20, to compositor 18 for combining (with potential reprojection).

Further, in some cases, a second one of the one the one or more applications 10 may generate the one or more visual cues 17, or second scene 20, while a first one of the one or more applications 10 may generate first scene 16. For example, in this case, the second one of the one the one or more applications 10 runs secondary virtual reality simulation 117 to generate one or more visual cues 17, or second scene 20, and the first one of the one or more applications 10 runs primary virtual reality simulation 115 to generate first scene 16. The first and second ones of the one or more applications 10 may then separately provide first scene 16 and one or more visual cues 17, or second scene 20, respectively, to compositor 18.

Additionally, in some cases, operating system 110 may generate the one or more visual cues 17, or second scene 20, while a first one of the one or more applications 10 may generate first scene 16. For example, in this case, operating system 110 runs secondary virtual reality simulation 117 to generate one or more visual cues 17, or second scene 20, and the first one of the one or more applications 10 runs primary virtual reality simulation 115 to generate first scene 16. Then, the first one of the one or more applications 10 and operation system 110 may then separately provide first scene 16 and one or more visual cues 17, or second scene 20, respectively, to compositor 18.

As explained above, although the one or more visual cues 17, or second scene 20, may be generated by a first one of the one or more applications 10, a second one of the one or more applications 10, or by operating system 110, for the sake of simplicity of explanation, the following example will be discussed based on an implementation in the first one of the one or more applications 10. In other words, in the following explanation, a same application 10 generates both first scene 16 and one or more visual cues 17, or second scene 20.

The first one of the one or more applications 10 may receive head motion information 14 from positional tracking system 107 that corresponds to movement in the real world by, for example, a user wearing display device 106 in the form of an HMD.

The first one of the one or more applications 10 may transform the head motion information 14 into virtual coordinates in order to express the head position and orientation in a coordinate system of a virtual simulation. The transformation of the head position/orientation from the received original physical coordinates into virtual coordinates may convert the head motion information 14 from position tracking system 107 to a potentially modified 'play-space' pose established during VR device setup (e.g., modifying the origin/center of the space from one dictated by absolute sensor positioning using an outside-in tracking system to one dictated by the user in selecting the center of the room based on furniture, or other objects in the room) and then potentially to the virtual user pose in the simulation (e.g., the tracking system may maintain coordinates in units of meters whereas a game may base its own coordinate system in units of feet, the tracking system may also treat the forward direction Z in positive values whereas the simulation may express forward using negative Z values). The first one of the one or more applications 10 may generate visual cue(s) 17 or second scene 20 based on the head motion information 14. The visual cue(s) 17 or second scene 20, and the relative motion of the visual cue(s) 17 or second scene 20, may be sourced based on head motion information 14 received from display device 106, such as an HMD. The visual cue(s) 17 or second scene 20 may produce visual signals to the brain which may be in agreement with those produced by vestibular system in response to physical motion of the user.

In one implementation, the visual cue(s) 17 may be presented anywhere in the first scene 16 so that the fusion of complementary visual and vestibular sensory inputs in the brain may overcome the conflicting display of virtual motion (relative to real world motion represented by head motion information 14) that may otherwise manifest as motion sickness.

In one implementation, the first one of the one or more applications 10 may render the visual cues 17 in the form of second scene 20 so that the second scene 20 may include motion that matches the vestibular sensory input of a user. As such, the second scene 20 may provide the visual cues 17 necessary to inhibit and/or prevent motion sickness of the user. In this implementation, the second scene 20 may correspond to a different virtual scene from that of first scene 16, where the elements may be composed of an entirely separate set of media. Although second scene 20 may include any type of media, content, or composition, examples of second scene 20 compositions may include, but are not limited to, a virtual lobby area, a virtual theater environment, or even a display of a current physical environment of a user. The current physical environment of the user may be achieved, for example, through room reconstruction by a reprojected feed of external camera(s) 109 in communication with computer device 102 and/or present on display device 106 or, for AR-capable display devices 106, a transparent view of the real world. The second scene 20 may be constructed in such a manner as to provide strong stereoscopic visual cues to the user, with detailed geometric and textural structure. For example, the second scene 20 may include geometric detail that provides depth relative to the walls of the virtual environment and/or visual cues to indicate movement in the virtual environment. As such, the second scene 20 may include an amount of motion independent from the first scene 16, and the second scene 20 may include an amount of motion that tracks the motion sensed by the inner ears of the user, for example, an amount of motion that is based on head motion information 14 from the display device 106 (e.g., an HMD).

In an implementation, the first one of the one or more applications 10 may use the following transformation matrix in the rendering of each eye for the second scene 20:

$$W * V^{head} * P$$

where W is the world matrix, P is the projection matrix, and $V^{head}$ is the tracked position and orientation of the head, and may incorporate an additional basis transform from an absolute tracking origin into a play-space relative origin that may be established during setup. In addition, either $V^{head}$ or P may apply eye offsets based on, for example, interpupillary distance. Thus, based on the above transformation matrix, the first one of the one or more applications 10 (or the second one of the one or more applications 10, or operation system 110) may generate one or more visual cues 17 or second scene 20 having motion based exclusively on head motion information 14 in order to substantially match motion sensed by a vestibular system of a user of system 100.

In some implementations, as mentioned above, compositor 18 may include a transition effect 121 between the first scene 16 and the second scene 20. The transition effect 121 may make the discontinuity between elements in the first scene 16 and the second scene 20 less visually stark, and may also reduce objectionable "window violation" stereoscopic artifacts between the first scene 16 and the second scene 20. Transition effect 121 may include, but are not limited to, cross-fades with dimming in the transition region (e.g., a region between the first scene 16 and the second scene 20), the introduction of a blurred border ring, a radial gradient dimming of the entire peripheral scene (e.g., brightest at the edges and gradually darkening toward the center), a dark border (e.g., a black or other dark color between the areas), a colored ring (e.g., a glowing ring between the areas), and blending the image from the first scene 16 into the second scene 20.

The first one of the one or more applications 10 may communicate instructions and data for rendering scenes from virtual reality simulation 22 to GPU 24. GPU 24 may generate rendered virtual first scene 113 (based on virtual first scene 16) and rendered virtual visual cue(s) or second scene 114 (based on virtual cue(s) 17 or virtual second scene 20), and/or it may render a unified composition of first scene 16 and visual cue(s) 17, or second scene 20 to generate display frame(s) 25. Compositor 18 may optionally combine rendered first scene 113 with rendered second scene 114, and optionally may add transition effect 121 to such renderings, thereby generating display frame(s) 25. Compositor 18 and/or GPU 24 may determine when to transmit display frame(s) 25 containing the combined scenes to display controller 26 for forwarding to and presentation on display device 106. The rendering operations performed by GPU 24 may be computationally intense. The time for completing the rendering operations may depend on the quality of the displayed images being produced. For example, the rendering time may be based on factors such as resolution and color formats, as well as quality of various visual effects (e.g., shadows or particles). The quality of the images may be adjusted based on hardware capability so that the GPU 24 may be capable of generating new display frames at the refresh rate of the display device 106. For example, a refresh rate for virtual reality (e.g., virtual reality simulation 22) may be 90 Hz, resulting in a refresh every 11 milliseconds. Compositor 18 and/or GPU 24 may communicate with display controller 26 to transmit the rendered display frame 25 for presentation on display device 106.

Display controller 26 may instruct display interface 28 to communicate the rendered display frame 25 to display device 106 for presentation on display device 106.

As such, the display frame 25 presented on display panel 32 may include rendered first scene 113 (corresponding to virtual first scene 16) having motion based on virtual motion information 12 and head motion information 14. The rendered first scene 113 may optionally include one or more rendered visual cues 114 (based on virtual visual cues 17) having motion based exclusively on head motion information 14. Alternatively, the presented display frame 25 may include rendered first scene 113 and rendered second scene 114 (based on virtual second scene 20) including or defining the one or more visual cues 17. In either case, the rendered first scene 113 may correspond to a central area or focal area being viewed by a user in a view region on display panel 32 (and may have some amount of virtual motion, e.g., based on virtual motion information 12), and the rendered visual cue(s) or second scene 114 may be an area outside of the central or focal area in the view region (and has independent motion, e.g., tied to the head motion information 14).

The relative diameters of the display regions bounding the rendered first scene 113 and rendered visual cue(s) or second scene 114 may be dependent on the display area of the display panel 32. In addition, the relative diameters of the bounding regions of the rendered first scene 113 and rendered visual cue(s) or second scene 114 may be user-controlled based on a susceptibility to motion sickness of the user. For example, a user may expand or minimize the rendered first scene 113 based on a susceptibility to motion sickness. If a user has a lower susceptibility to motion sickness, the user may select to expand the rendered first scene 113 to have a larger view region and minimize the view region of rendered visual cue(s) or second scene 114. However, if a user has a higher susceptibility to motion sickness, the user may select to increase the view region of rendered visual cue(s) or second scene 114 while reducing the view region of the rendered first scene 113.

In other words, the presented display frame 25 may include rendered first scene 113 with a first display region having an amount of motion that tracks the motion of the virtual scene. At the same time, rendered visual cue(s) or second scene 114 may be peripheral to the rendered first scene 113 and may have a second display region different from the first display region. The peripheral area of rendered visual cue(s) or second scene 114 may have an amount of motion that is exclusively dependent upon the motion of the viewer, and thus may be independent of the motion of the first virtual scene. Specifically, the peripheral area may have an amount of motion that tracks the motion sensed by the inner ears of the user, for example, an amount of motion based on motion inputs from the HMD device, e.g., head motion information 14 from positional tracking system 107. As such, the presented display frame(s) 25 may improve user comfort by reducing conflicting signals from the eyes and inner ears of the user, thereby reducing or eliminating nausea, motion sickness, or vertigo.

An example use case may include a user playing a virtual game and the user moves a character in the virtual game (e.g., virtual reality simulation 22) forward using an external controller 108, while physically staying stationary (e.g., there is no head motion information 14 from positional tracking system 107). The display frame 25 may include rendered first scene 113 with the character in the virtual game moving forward along with rendered second scene 114 that includes stationary visual cues 17. The stationary visual cues 17 may produce visual signals to the brain of the user which may be in agreement with those produced by vestibular system in response to the user staying stationary so that the fusion of complementary visual and vestibular sensory inputs in the brain may overcome the conflicting display of virtual motion that may otherwise manifest as motion sickness.

Another example use case may include a user playing a virtual game and the user moves a character in the virtual game forward using external controller 108 while the head of the user is rotating left and right (e.g., the received head motion information 14 from positional tracking system 107 is left and right). The display frame 25 may include rendered first scene 113 with the character in the virtual game moving forward while looking left and right in the virtual game. The display frame 25 may also include rendered second scene 114 that includes a set of visual cues 17. The visual cues 17 included in the rendered second scene 114 may not indicate forward motion since the user is physically not moving forward, but may match the received left and right movement of the head rotation of the user.

Yet another example use case may include a user playing a virtual game and the user moves a character in the virtual game forward by physically walking forward and may have a character look left or right in the virtual game using external controller 108. The display frame 25 may include rendered first scene 113 with the character moving forward based on the received head motion information 14 from positional tracking system 107 and looking left and right in the virtual game based on the virtual motion information 12 received from external controller 108. The display frame 25 may also include visual cues 17 throughout the rendered second scene 114 that reflect forward motion, tracking the physical movement of the user.

When application(s) 10 and/or operating system 110 stop receiving virtual motion information 12 from the external controller 108 and/or virtual reality simulation 22 after a predetermined period of time (e.g., the user virtually stops moving, excluding head motion, for five seconds), the rendered first scene 113 may be dynamically expanded back out to cover the entire display region of display panel 32. For example, application(s) 10 or operating system 110 may remove the visual cues 17 and/or the rendered second scene 114 from the presented display frame 25. An animated expansion of the rendered first scene 113 may occur after the virtual motion information 12 stops. The rendered first scene 113 may maintain full coverage of the entire display region until such time as another secondary independent motion influence is detected (e.g., virtual motion information 12 from the external controller 108), and rendered second scene 114 may once again become visible to the user. The rendered second scene 114 may provide instant anchoring cues to a user through one or more visual cues 17.

Figure 2:
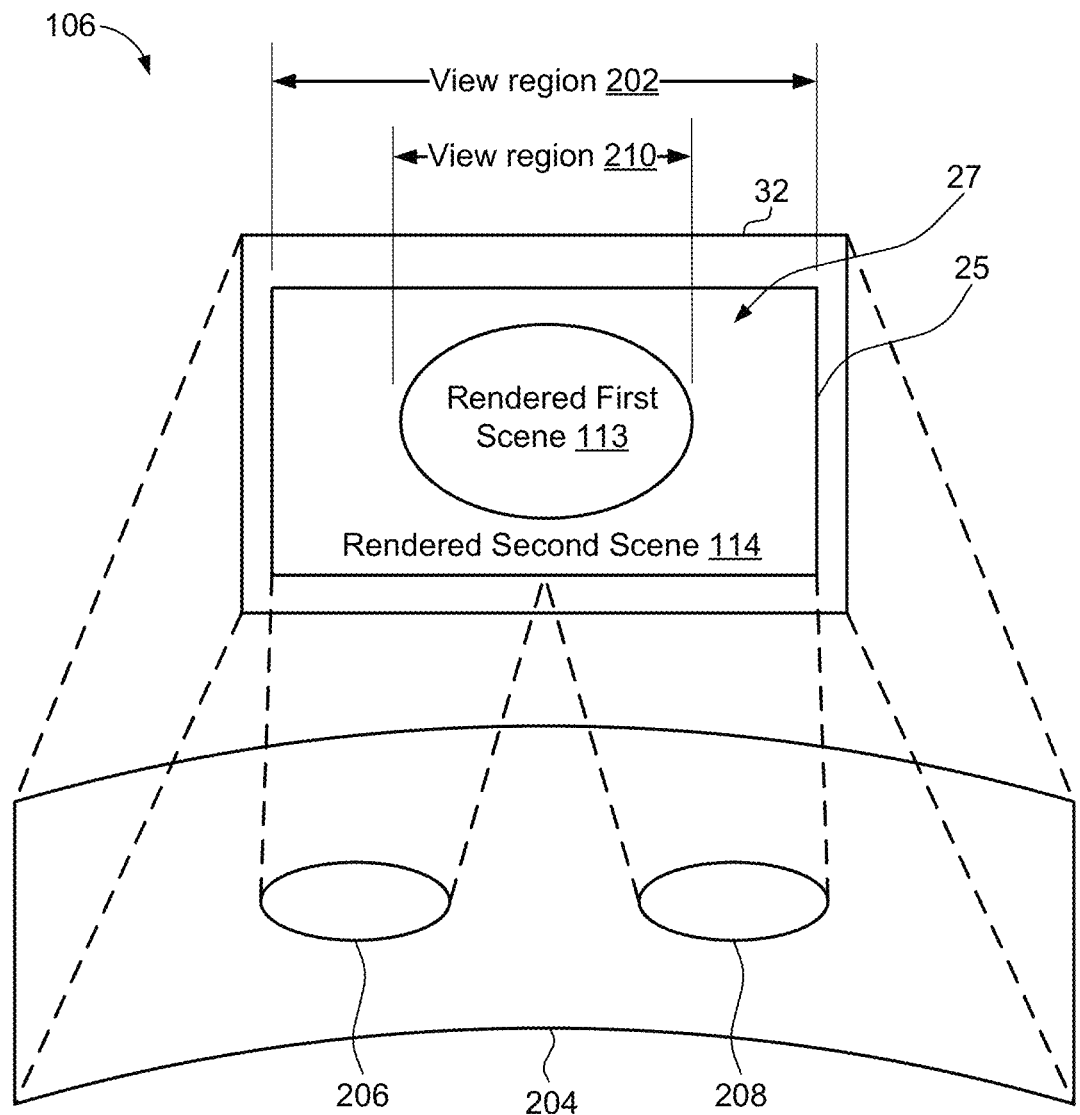
FIG. 2 is a schematic diagram of optics and a display panel of a head mounted display for displaying virtual reality images in accordance with an implementation of the present disclosure.

Referring now to FIG. 2, a conceptual diagram illustrates operation of a lens and display of an example display device 106, such as an HMD, in accordance with an implementation. The display device 106 may include optics 204 (e.g., one or more lenses) for focusing a user's vision on one or more portions of a view area 27 of one or more display panels 32. For example, the display panels 32 may include a liquid crystal display (LCD) (which may include a light emitting diode (LED) backlit LCD display), organic LED (OLED) display, digital light processing (DLP) display, etc. The display panels 32 may display one or more images (e.g., left eye image and right eye image) based on signals received from display controller 26 (FIG. 1). In an implementation, display controller 26 may provide display device 106 with a multiplexed left eye image and right eye image in a side-by-side arrangement. It should be appreciated that the left eye image and right eye image may also be multiplexed vertically or in time. The display panels 32 may scan an image (e.g., presented frame) from the display port 34 (FIG. 1). As used herein, scanning may refer to a process of updating pixels on the display panel(s) 32.

The optics 204 may include left eye optics 206 for focusing the user's left eye on the left eye image and right eye optics 208 for focusing the user's right eye on the right eye image. For example, the optics 206 may focus the user's eyes on a central portion of each of the left eye image and the right eye image. The user's brain may combine the images viewed by each eye to create the perception that the user is viewing a 3D environment. For example, both the left eye image and the right eye image may include presented frame contents that may be perceived as a three dimensional object.

The presented display frame 25 may include rendered first scene 113 with a first view region 210 having an amount of motion that tracks the motion of the virtual scene of virtual world 111 based on at least virtual motion information 12. At the same time, the presented display frame 25 may include rendered second scene 114 peripheral to rendered first scene 113. Rendered second scene 114 may have a second view region 202 of a size (height and/or width) different from the first view region 210. The peripheral area of view area 27 occupied by rendered second scene 114 may have an amount of motion that is independent of the motion of the virtual scene, e.g., independent of rendered first scene 113. In particular, rendered second scene 114 may have an amount of motion that is based on head motion information 14 from positional tracking system 107, thereby substantially matching real world motion sensed by a vestibular system of a user.

Figure 3:
FIG. 3 is a schematic diagram of a virtual reality simulation with two scenes in accordance with an implementation of the present disclosure.

Referring to FIG. 3, an example display frame 25 displayed on display device 106 (FIG. 1) is illustrated. The presented display frame 25 may include rendered first scene 113 corresponding to a virtual scene for virtual world 11 (FIG. 1) of application 10 (FIG. 1). In addition, the presented display frame 25 may include rendered second scene 114 (FIG. 1) that tracks the movement of a user based on head motion information 14 (FIG. 1) received from positional tracking system 107 (FIG. 1). The presented display frame 25 may also include a transition effect 121 between rendered first scene 113 and rendered second scene 114 that makes the discontinuity between elements in the scenes less visually stark. Transition effect 121 may include, but is not limited to, cross-fades with dimming in the transition region, the introduction of a blurred border ring, and radial gradient dimming of the entire peripheral scene (brightest at the edges and gradually darkening toward the center).

As described above, in the example of FIG. 3, two independent scenes within the virtual reality simulation are maintained. Rendered first scene 113 includes a display of the primary virtual reality simulation 115, and the camera used in rendering it may be influenced by input control (e.g. a gamepad, keyboard, or mouse) separate from that of display device 106 (e.g., the head-mounted display) or by logic in the simulation itself. When no camera motion independent of that provided by head tracking (e.g., head motion information 14 received from positional tracking system 107) is applied, rendered first scene 113 may occupy the entire display. But once independent motion is applied which is found to be at odds with vestibular signals, the display region of the primary scene, e.g., rendered first scene 113, may be dynamically reduced, such that the scene is pulled in toward the center of vision and then ringed by a secondary scene, e.g., rendered second scene 114, occupying the peripheral vision of the user.

Rendered second scene 114, e.g., the peripheral scene, is rendered using a camera controlled exclusively by head-tracked motion (e.g., head motion information 14 received from positional tracking system 107) in order to match vestibular sensory input. The peripheral scene provides the visual cues 17 necessary to inhibit motion sickness. The elements of this scene may have an affinity with the content from the primary scene, or they may be composed of an entirely separate set of media. Examples of peripheral scene composition include a virtual lobby area containing art assets from a game comprising the primary scene, a virtual theater environment, or even a display of a user's current physical environment (achieved through room reconstruction, a reprojected feed of external camera(s) present on the HMD or, for AR-capable displays, a transparent view of the real world). In some implementations, peripheral scenes are constructed in such a manner as to provide strong stereoscopic visual cues to the user, with detailed geometric and textural structure.

Camera control of the two scenes may be described in terms of the matrices used in their rendering, as described in detail above.

After all viewer motion not derived from head tracking has ceased for a determined period of time, rendered first scene 114 (e.g., the primary scene) may be dynamically expanded back out to cover the entire display. An animated expansion of the inner disc region is preferable to an immediate snap to full view. The primary scene may then maintain full coverage until such time as another secondary independent motion influence is detected, and rendered second scene 114 (e.g., the peripheral scene) is once again made visible. It may be desirable to make this transition from full to dual scenes a more immediate one to provide instant anchoring cues. As for the relative diameters of rendered first scene 113 and rendered second scene 114 (e.g., the primary and peripheral scene, respectively), it may be partially dependent on the field of view of the display and may even be user-controlled based on an individual's susceptibility to motion sickness.

Figure 4:
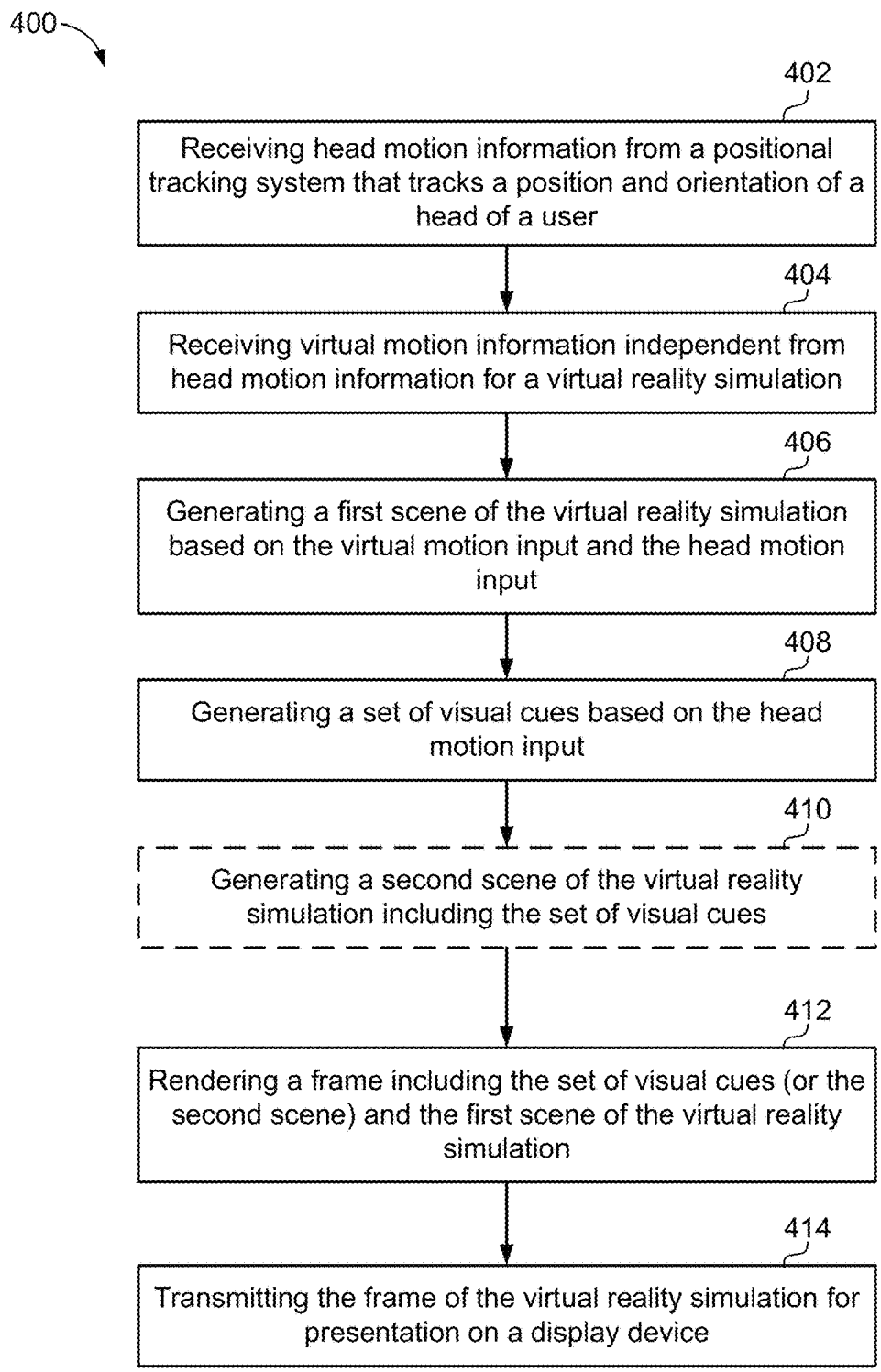
FIG. 4 is a flow chart of a method for displaying virtual reality images in accordance with an implementation of the present disclosure.

Referring now to FIG. 4, a method 400 for presenting VR images may be implemented on operating system 110 (FIG. 1) of computer device 102 (FIG. 1). For example, method 400 may be used for displaying frames of virtual reality simulation 22 generated by computer device 102 on display device 106 (e.g., a HMD) that reduces and/or prevents user discomfort, such as simulation sickness or motion sickness, when viewing the presented frames.

At 402, method 400 may include receiving head motion information from a positional tracking system that tracks a position and orientation of a head of a user. For example, application(s) 10 (FIG. 1) and/or operating system 110 (FIG. 1) may receive head motion information 14 (FIG. 1) from positional tracking system 107, which may track a position and orientation of a head of a user and/or of display device 106, such as a HMD that may be worn by the user, where a user is looking (e.g., a gaze direction of the eyes), and/or a focus of a user. The head motion information 14 may correspond to movement of a user in the real world.

At 404, method 400 may include receiving virtual motion information independent from head motion information for a virtual reality simulation. For example, application(s) 10 (FIG. 1) and/or operating system 110 (FIG. 1) may receive virtual motion information 12 (FIG. 1) from one or more external controllers 108 (FIG. 1). External controllers 108 may include, but are not limited to, a gamepad, a joystick, a keyboard, and a mouse. In addition, the virtual motion information 12 may be received based on, for example, designs of the virtual reality simulation 22.

At 406, method 400 may include generating a first scene of the virtual reality simulation based on the virtual motion information and the head motion information. A first one of the one or more application(s) 10 in combination with GPU 24 may generate first scene 16 of virtual reality simulation 22 based on the virtual motion information 12 and the head motion information 14. The first scene 16 may correspond to primary virtual reality simulation 115 for the virtual world 11 and may have an amount of motion that tracks the motion of the virtual world 11.

At 408, method 400 may include generating at set of visual cues based on the head motion information. For example, a first or second one of the one or more applications 10 or operating system 110 may generate one or more visual cues 17 based on the received head motion information 14. The visual cues 17, and the relative motion of the visual cues 17, may be sourced based on head motion information 14 received from positional tracking system 107, which may monitor position, orientation, and movement of display device 106, e.g., a HMD. The visual cues 17 may include spatial elements with detailed textural structure to help minimize and/or inhibit motion sickness of the user. For example, visual cues 17 may include, but are not limited to, lines or abstract design patterns, lights, sparks, smoke, snowflakes, bubbles, and particle effects. The textures of the visual cues 17 may be dependent on the content of the first scene 16 of virtual reality simulation 22, or the visual cues 17 may be composed of an entire separate set of media. In addition, the visual cues 17 may produce visual signals to the brain which may be in agreement with those produced by a vestibular system of a user (e.g., wearing a HMD) in response to physical motion of the user without distracting the user from the virtual simulation 22.

At 410, method 400 may optionally include generating a second scene of the virtual reality simulation with the set of visual cues. For example, application(s) 10 and/or operating system 110 may also generate second scene 20, e.g., based on running secondary virtual reality simulation 117, based on the head motion information 14 to insert in or be combined with first scene 16 of virtual reality simulation 22. The second scene 20 may include the visual cues 17 that match the vestibular sensory information of a user. As such, the second scene 20 may provide the visual cues 17 necessary to inhibit and/or prevent motion sickness of the user. The second scene 20, e.g., based on running secondary virtual reality simulation 117, may correspond to a different virtual scene (as compared to first scene 16), or to an independent view of areas of the original virtual scene (e.g., first scene 16). Elements included in the second scene 20 may have an affinity with the content from the first scene 16, or the elements may be composed of an entirely separate set of media. The second scene 20 may be constructed in such a manner as to provide strong stereoscopic visual cues 17 to the user, with detailed geometric and textural structure to help minimize and/or inhibit motion sickness of the user. For example, for a virtual lobby scene, visual cues 17 may include, but are not limited to, shelving, lines or designs on walls, light fixtures, and furniture. In another example, if a second scene comprising the visual cues 17 was instead chosen to be an outdoor recess in a forest, the details of the visual cues 17 could include trees, leaves, and grass. The geometry and textures of visual cues 17 are dependent on the chosen scene. The second scene 20 may include an amount of motion independent from the first scene 16, where the independent motion exclusively tracks the motion sensed by the inner ears of the user. For example, an amount of motion of second scene 20 is based on head motion information 14 from positional tracking system 107, which monitors motion of the head of the user and/or motion of display device 106 (e.g., an HMD).

At 412, method 400 may include rendering a frame including the set of visual cues (or, optionally, the second scene) and the first scene of the virtual reality simulation. For example, a first one of the one or more applications 10 (if running both primary virtual reality simulation 115 and secondary virtual reality simulation 117) may combine visual cues 17 (or second scene 16) and first scene 16 and optionally forward the combination to compositor 18. Alternatively, for example, compositor 18 may separately receive visual cues 17 (or second scene 16) from a first or second one of applications 10 or from operating system 110, and first scene 16 from the first one of the applications 10. Compositor 18 may operate in conjunction with GPU 24 to combine the set of visual cues 17 (or second scene 16; or rendered visual cues or second scene 114) and first scene 16 (or rendered first scene 113) resulting in display frame 25 that represents a scene in virtual reality simulation 22. Visual cues 17 may be placed anywhere within the view region of display frame 25 as presented on display panel 32 of display device 106. In one implementation, compositor 18 may combine the visual cues 17 (or rendered visual cues 114) within the first scene 16 (or rendered first scene 113), for example, as a grid of visual cues 17 (or rendered visual cues 114) blended over the entire first scene 16 (or rendered first scene 113). In another implementation, compositor 18 may combine second scene 20 (or rendered visual cues or second scene 114) in a peripheral area around first scene 16 (or rendered first scene 113).

At 414, method 400 may include transmitting the frame of the virtual reality simulation for presentation on the display device. For example, compositor 18 and/or GPU 24 may generate display frame 25, including rendered first scene 113 and rendered visual cues or second scene 114, and optionally including transition effect 121, and may operate in cooperation with display controller 26 to determine when to transmit display frame 25 for presentation on display device 106. Compositor 18 and/or GPU 24 may be capable of generating new rendered display frames 25 for virtual reality simulation 22 at the refresh rate of the display device 106. For example, a refresh rate for virtual reality may be 90 Hz, resulting in a refresh every 11 milliseconds.

As such, rendered display frame 25 presented on display device 106 may include rendered first scene 113 with visual cue(s) 17, or rendered first scene 113 and rendered second scene 114 (which includes visual cue(s) 17). In some implementations, rendered first scene 113 corresponds to a central area or focus area being viewed by a user, and rendered first scene 113 may be based on the primary virtual reality simulation 115 and may have an amount of virtual motion corresponding to virtual motion information 12. Rendered second scene 114 may be located in a periphery around first scene 113, such as in an area outside of the focus area of rendered first scene 113. Further, visual cue(s) 17 and/or rendered second scene 114 have an independent motion, e.g., relative to the motion of rendered first scene 113, where the independent motion is tied exclusively to head motion information 14). The rendered display frame 25 may also include a transition effect 121 between rendered first scene 113 and visual cues 17 and/or rendered second scene 114. The transition effect 121 may make the discontinuity between elements in rendered first scene 113 and visual cues 17 and/or rendered second scene 114 less visually stark. Thus, display frame 25 of virtual reality simulation 22 having one area associated with virtual motion and another area tied exclusively to head motion, as generated by the methods and apparatus of this disclosure, may improve user comfort by reducing or eliminating conflicting signals from the eyes and inner ears of the user, thereby reducing or eliminating nausea, motion sickness, or vertigo.

Figure 5:
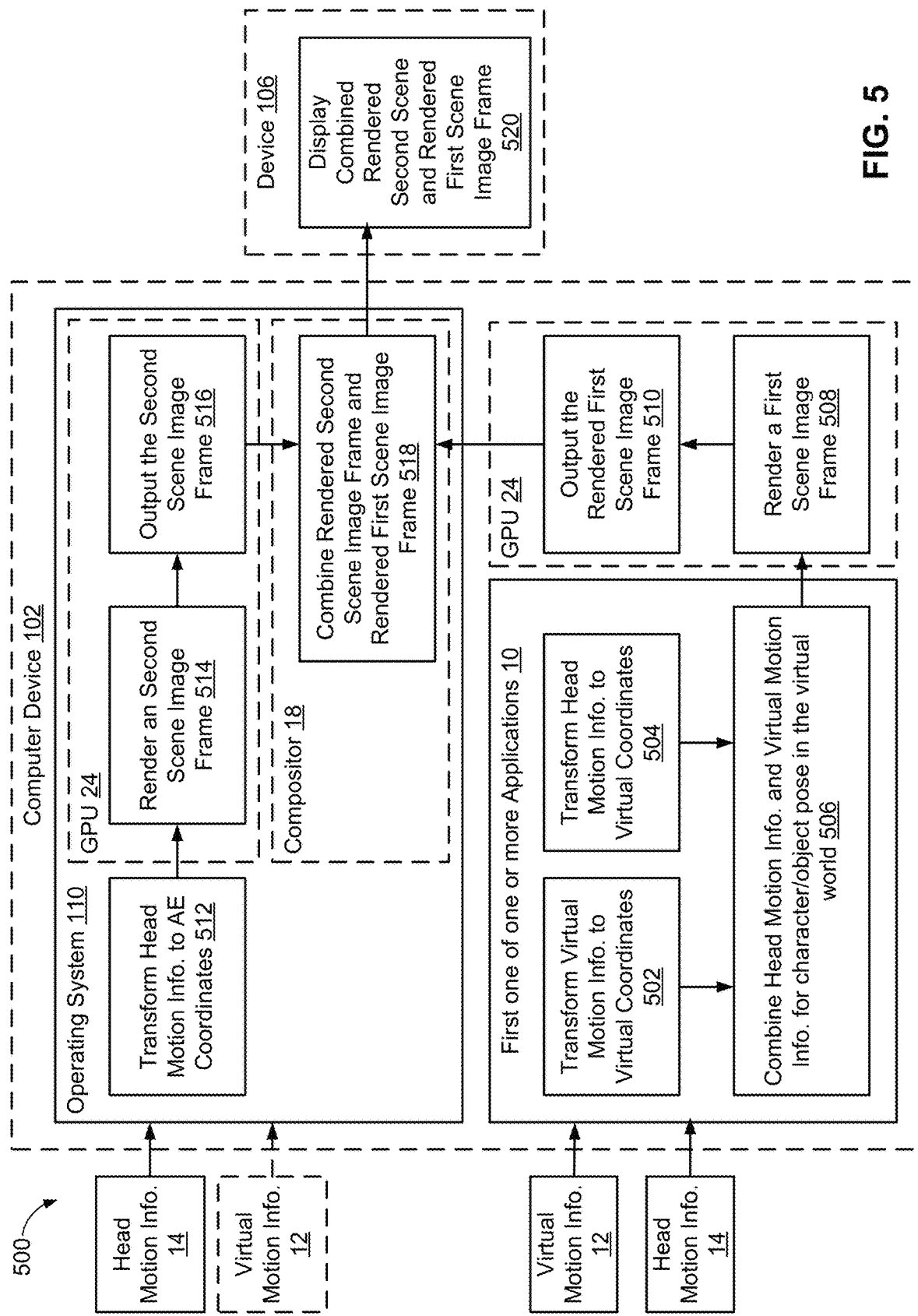
FIG. 5 is a flow chart of a method for displaying a virtual reality simulation with two scenes in accordance with an implementation of the present disclosure.

Referring now to FIG. 5, illustrated is a method 500 that may be used by computer device 102 to generate a rendered display frame 25 of virtual reality simulation 22 (FIG. 1) displaying the virtual world 11 (FIG. 1) as defined by rendered first scene 113 (FIG. 1) having motion based on at least virtual motion information 12 and rendered second scene 114 (FIG. 1), peripheral to rendered first scene 113, having motion only based on received head motion information 14. Due to the motion of rendered second scene 114 being similar to motion sensed by a vestibular system of a user, the presentation of display frame 25 on display device 106, such as an HMD, may minimize and/or prevent user discomfort, such as simulation sickness or motion sickness, when viewing the virtual reality simulation 22.

The illustrated implementation of method 500 includes a first one of the one or more applications generating first scene 16, and operating system 110 generating second scene 20. As mentioned above, however, other implementations may utilize the first one of the one or more applications 10 or a second one of the one or more applications 10 generating the second scene. Similar actions as those discussed below would apply to those other implementations.

At 502 and 504, method 500 may include transforming received virtual motion information and the received head motion information to virtual coordinates. The original physical coordinates received for the virtual motion information 12 and/or the head motion information 14 may be converted into positions and orientations, as expressed in the coordinate system of the simulation. The first one of the applications 10 may convert the virtual motion information 12 and/or head motion information 14 to associated character motion in the virtual world 11. For example, the first one of the applications 10 may convert the head motion information 14 received and/or the virtual motion information 12 received to a potentially modified 'play-space' pose established during VR device setup (e.g., modifying the origin/center of the space from one dictated by absolute sensor positioning using an outside-in tracking system to one dictated by the user in selecting the center of the room based on furniture or other objects in the room) and then potentially to the virtual user pose in the simulation (e.g., the tracking system may maintain coordinates in units of meters whereas a game may base its own coordinate system in units of feet, the tracking system may also treat the forward direction Z in positive values whereas the simulation may express forward using negative Z values).

At 506, method 500 may include combining the virtual coordinates of the virtual motion information and the head motion information to determine a character position in the virtual world. For example, the first one of the applications 10 may use a first transformation matrix (e.g., $W*V^{simulation}*V^{head}*P$, as explained above) to combine the virtual head motion information 504 and the virtual motion information 502 to determine a virtual position of a character and/or object in the virtual world 11. The first one of the one or more applications 10 may first transform the model geometry into world space, followed by transformation into the virtual location and orientation of the user in the simulation, followed by a relative repositioning/reorientation dictated by head-tracked pose (e.g., head motion information 14).

At 508 and 510, method 500 may include rendering a first scene image frame and outputting the first scene image frame. The first one of the applications 10 may generate the first scene 16 (FIG. 1) for the virtual world 11 based on the virtual position of a character and/or object for a scene in the virtual world 11. In an implementation, the first one of the applications 10 may generate first scene 16 based on running primary virtual reality simulation 115. The first scene 16 may correspond to an original view region of the virtual scene and may track the motion of the virtual scene. The first one of applications 10 may also output a projection of the first scene 16 for display. For example, the first one of the applications 10 may transmit the first scene 16 to the GPU 24 to render the first scene 16, thereby outputting rendered first scene 113.

At 512, method 500 may include transforming the received head motion information into anchoring environment coordinates. For example, operating system 110 may use a second transformation matrix (e.g., $W*V^{head}*P$, as described above) in the rendering of each eye for the second scene 20.

At 514 and 516, method 500 may include rendering a second scene image frame and outputting the second scene image frame. Operating system 110 may render second scene 20 for an anchoring environment peripheral to the first scene 16 based on the head motion information 14. The second scene 20 may be based on secondary virtual reality simulation 117, and may correspond to a different virtual scene, or to an independent view of areas of the original virtual scene. Elements included in the second scene 20 may have an affinity with the content from the first scene 16, or the elements may be composed of an entirely separate set of media. The second scene 20 may have an amount of motion that is independent of the motion of the virtual scene, e.g., first scene 16. Specifically, the peripheral area of anchoring environment may have an amount of motion that tracks the motion sensed by the inner ears of the user, for example, an amount of motion exclusively based on head motion information 14 from positional tracking device 107. In an implementation, second scene 20 includes or is a form of visual cues 17. Further, for example, operating system 110 may transmit second scene 20 to the GPU 24 to render second scene 20, thereby outputting rendered visual cues or second scene 114.

At 518, method 500 may include combining the rendered second scene image frame and the rendered first scene image frame and outputting the combined display image for display. Compositor 18 may optionally reproject rendered first scene 113 and/or rendered visual cues or second scene 114 based on updated head motion information 14. Compositor 18 may generate a combined image frame, e.g., display frame 25, by combining rendered first scene 113 and rendered visual cues or second scene 114. The combined image frame may include a transition effect 121 between rendered first scene 113 and rendered visual cues or second scene 114. The transition effect 121 may make the discontinuity between elements in rendered first scene 113 and rendered visual cues or second scene 114 less visually stark. Compositor 18 may output the combined image frame, e.g., display frame 25, for display on display device 106.

At 520, method 500 may include displaying the combined virtual image. The displayed combined virtual image, e.g., display frame, may include rendered first scene 113 with a first display region having an amount of motion that tracks the motion of the virtual scene, e.g., corresponding to virtual motion information 12. At the same time, rendered second scene 114 may be peripheral to rendered first scene 113 and may have a second display region different from the first display region. The peripheral area of display frame 25 occupied by rendered second scene 114 may have an amount of motion that is independent of the motion of the virtual scene, e.g., rendered first scene 113. Specifically, the peripheral area may have an amount of motion that tracks the motion sensed by the inner ears of the user, for example, an amount of motion based on head motion information 14 from positional tracking system 107. As such, the combined image of display frame 25 may improve user comfort by reducing or eliminating conflicting signals from the eyes and inner ears of the user, thereby reducing or eliminating nausea, motion sickness, or vertigo.

Figure 6:
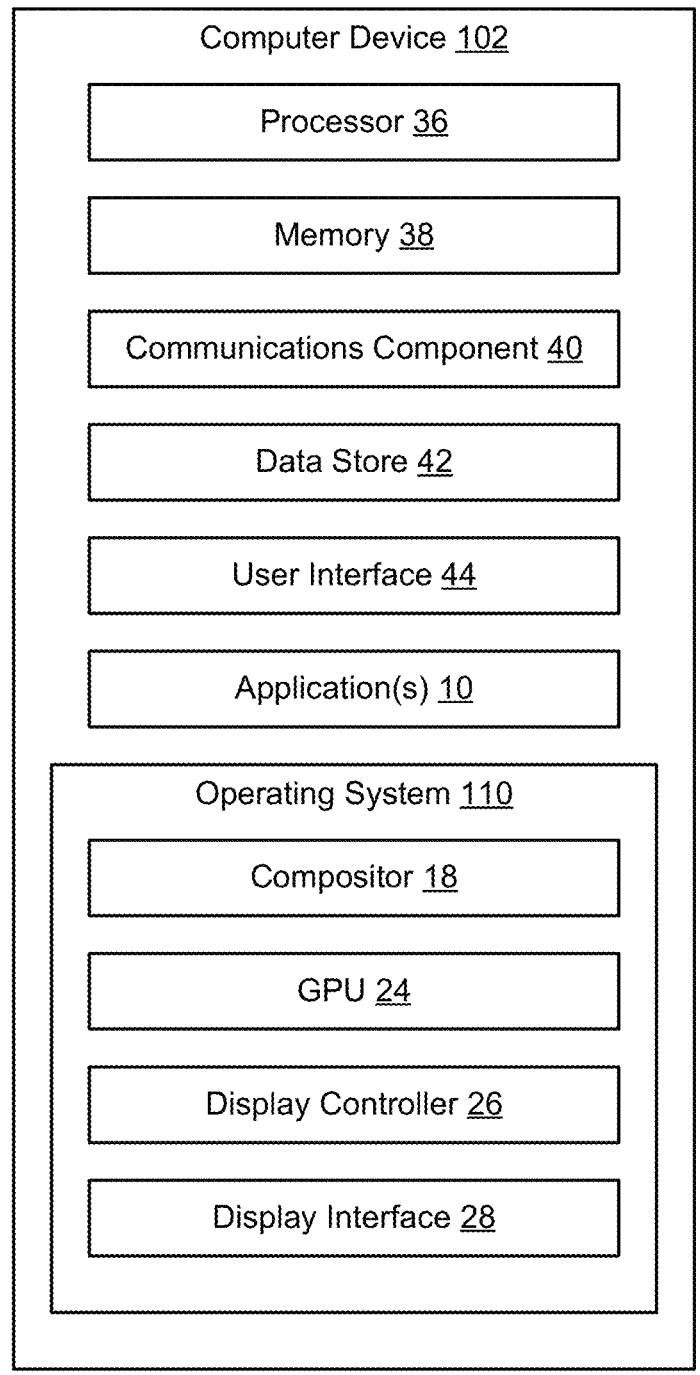
FIG. 6 is a schematic block diagram of an example device in accordance with an implementation of the present disclosure.

Referring now to FIG. 6, illustrated is an example of computer device 102 in accordance with an implementation, including additional component details as compared to FIG. 1.

Computer device 102 may include a communications component 40 that provides for establishing and maintaining communications with one or more parties utilizing hardware, software, and services as described herein. Communications component 40 may carry communications between components on computer device 102, as well as between computer device 102 and external devices, such as devices located across a communications network and/or devices serially or locally connected to computer device 102. For example, communications component 40 may include one or more buses, and may further include transmit chain components and receive chain components associated with a transmitter and receiver, respectively, operable for interfacing with external devices.

Additionally, computer device 102 may include a data store 42, which can be any suitable combination of hardware and/or software, that provides for mass storage of information, databases, and programs employed in connection with implementations described herein. For example, data store 42 may be a data repository for applications 10 (FIG. 1), compositor 18 (FIG. 1), GPU 24 (FIG. 1), display controller 26 (FIG. 1), and/or display interface 28 (FIG. 1).

Computer device 102 may also include a user interface component 44 operable to receive inputs from a user of computer device 102 and further operable to generate outputs for presentation to the user. User interface component 44 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 44 may include one or more output devices, including but not limited to a display, a speaker, a haptic feedback mechanism, a printer, any other mechanism capable of presenting an output to a user, or any combination thereof.

In an implementation, user interface component 44 may transmit and/or receive messages corresponding to the operation of applications 10, compositor 18, GPU 24, display controller 26, and/or display interface 28. In addition, processor 36 executes applications 10, compositor 18, GPU 24, display controller 26, and/or display interface 28, and memory 38 or data store 42 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
a memory storing at least one application configured to run a virtual reality simulation;
at least one processor in communication with the memory and configured to execute the at least one application to run the virtual reality simulation, wherein the at least one processor is operable to:
receive head motion information that corresponds to real world movement of a user;
receive virtual motion information from the virtual reality simulation that defines a virtual motion different from the real world movement;
generate a first scene of the virtual reality simulation having the virtual motion;
generate a set of visual cues that have an amount of motion corresponding to the real world movement over a set of frames, wherein the set of visual cues include at least one visible element in a peripheral ring surrounding a center of vision of the user;
render the set of frames including combining the set of visual cues and the first scene of the virtual reality simulation; and
transmit the set of frames for presentation on a display device.

2. The computer device of claim 1, wherein the at least one processor is operable to receive the head motion information from a positional tracking system that tracks one or more of a position of the user, an orientation of the user, or movement of the user.

3. The computer device of claim 1, wherein the at least one visible element further includes geometric detail or textural structure that provides depth relative to the virtual reality simulation.

4. The computer device of claim 1, wherein the at least one processor is operable to remove the set of visual cues in response to stopping of the virtual motion information or a reduction in the virtual motion information.

5. The computer device of claim 4, wherein the at least one processor is operable to insert the set of visual cues in response to an increase in the virtual motion information or a new input of the virtual motion information.

6. The computer device of claim 1, wherein the at least one processor is operable to:
render a second scene independent from the first scene to insert into the virtual reality simulation, wherein the second scene includes the set of visual cues.

7. The computer device of claim 6, wherein the first scene corresponds to a central focal area of the display device and the second scene corresponds to an outside area of the central focal area of the display device.

8. The computer device of claim 6, wherein the at least one processor is operable to minimize or expand a display region of the second scene in response to at least one of changes in the virtual motion information or user input.

9. The computer device of claim 6, wherein a first amount of virtual motion of the first scene is independent from a second amount of virtual motion of the second scene.

10. The computer device of claim 6, wherein the virtual reality simulation includes a transition effect between the first scene and the second scene.

11. A method for presenting a virtual reality image, comprising:
   receiving head motion information that corresponds to real world movement of a user;
   receiving virtual motion information from a virtual reality simulation that defines a virtual motion different from the real world movement;
   generating a first scene of the virtual reality simulation having the virtual motion;
   generating a set of visual cues that have an amount of motion corresponding to the real world movement over a set of frames, wherein the set of visual cues include at least one visible element in a peripheral ring surrounding a center of vision of the user;
   rendering the set of frames including combining the set of visual cues and the first scene of the virtual reality simulation; and
   transmitting the set of frames for presentation on a display device.

12. The method of claim 11, wherein the head motion information is received from a positional tracking system that tracks one or more of a position of the user, an orientation of the user, or movement of the user.

13. The method of claim 11, wherein the at least one visible element further includes geometric detail or textural structure that provides depth relative to the virtual reality simulation.

14. The method of claim 11, wherein the method further comprises:
   removing the set of visual cues in response to stopping of the virtual motion information or a reduction in the virtual motion information.

15. The method of claim 14, wherein the method further comprises:
   inserting the set of visual cues in response to an increase in the virtual motion information or a new input of the virtual motion information.

16. The method of claim 11, wherein the method further comprises:
   rendering a second scene independent from the first scene to insert into the virtual reality simulation, wherein the second scene includes the set of visual cues.

17. The method of claim 16, wherein the first scene corresponds to a central focal area of the display device and the second scene corresponds to an outside area of the central focal area of the display device.

18. The method of claim 16, wherein the method further comprises:
   minimizing or expanding a display region of the second scene in response to at least one of changes in the virtual motion information or user input.

19. The method of claim 16, wherein a first amount of virtual motion of the first scene is independent from a second amount of virtual motion of the second scene.

20. The method of claim 16, wherein the virtual reality simulation includes a transition effect between the first scene and the second scene.

21. A non-transitory computer-readable medium storing instructions executable by a computer device, comprising:
   at least one instruction for causing the computer device to receive head motion information that corresponds to real world movement of a user;
   at least one instruction for causing the computer device to receive virtual motion information from a virtual reality simulation that defines a virtual motion different from the real world movement;
   at least one instruction for causing the computer device to generate a first scene of the virtual reality simulation having the virtual motion;
   at least one instruction for causing the computer device to generate a set of visual cues that have an amount of motion corresponding to the real world movement over a set of frames, wherein the set of visual cues include at least one visible element in a peripheral ring surrounding a center of vision of the user;
   at least one instruction for causing the computer device to render the set of frames including combining the set of visual cues and the first scene of the virtual reality simulation; and
   at least one instruction for causing the computer device to transmit the set of frames for presentation on a display device.

* * * * *